US012194421B1

(12) United States Patent
Richie et al.

(10) Patent No.: US 12,194,421 B1
(45) Date of Patent: *Jan. 14, 2025

(54) MULTI CHAMBER MIXING MANIFOLD

(71) Applicant: TETRA TECHNOLOGIES, INC., The Woodlands, TX (US)

(72) Inventors: Robert Irl Richie, Conroe, TX (US); Scott Allen Richie, The Woodlands, TX (US); Leroy Joseph Detiveaux, Jr., Spring, TX (US); Virgilio Garcia Soule, Cypress, TX (US); John Anthony Novotny, Houston, TX (US)

(73) Assignee: TETRA Technologies, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,142

(22) Filed: Jun. 30, 2023

Related U.S. Application Data

(63) Continuation of application No. 17/073,477, filed on Oct. 19, 2020, now Pat. No. 11,691,112, which is a continuation of application No. 16/107,943, filed on Aug. 21, 2018, now Pat. No. 10,807,050, which is a continuation of application No. 15/384,860, filed on Dec. 20, 2016, now Pat. No. 10,052,595, which is a continuation of application No. 13/751,256, filed on Jan. 28, 2013, now Pat. No. 9,522,367, which is a continuation-in-part of application No. 13/458,526, filed on Apr. 27, 2012, now Pat. No. 8,834,016.

(60) Provisional application No. 61/479,641, filed on Apr. 27, 2011.

(51) Int. Cl.
*B01F 25/00* (2022.01)
*B01F 23/45* (2022.01)
*B01F 23/50* (2022.01)
*B01F 25/10* (2022.01)
*B01F 25/431* (2022.01)
*B01F 35/71* (2022.01)
*B01F 101/49* (2022.01)

(52) U.S. Cl.
CPC ............ *B01F 25/102* (2022.01); *B01F 23/45* (2022.01); *B01F 23/50* (2022.01); *B01F 25/103* (2022.01); *B01F 25/4316* (2022.01); *B01F 35/712* (2022.01); *B01F 35/716* (2022.01); *B01F 2101/49* (2022.01)

(58) Field of Classification Search
CPC .. B01F 25/102; B01F 25/4316; B01F 35/712; B01F 23/50; B01F 35/716; B01F 23/45; B01F 2101/49; B10F 25/103
See application file for complete search history.

(56) References Cited

U.S. PATENT DOCUMENTS 10,052,595 B1 * 8/2018 Richie ..................... B01F 23/45

* cited by examiner

*Primary Examiner* — Anshu Bhatia
(74) *Attorney, Agent, or Firm* — Roy Kiesel Ford Doody & North, APLC; Brett A. North

(57) ABSTRACT

One or more embodiments relate to systems and methods for mixing of two or more fluids using a multi-chamber manifold. One or more embodiments relate to optimal mixing.

18 Claims, 6 Drawing Sheets

MULTI CHAMBER MIXING MANIFOLD

CROSS-REFERENCE TO RELATED APPLICATIONS

This is a continuation of U.S. patent application Ser. No. 17/073,477, filed on Oct. 19, 2020, (issuing as U.S. Pat. No. 11,691,112 on Jul. 4, 2023), which is a continuation of U.S. patent application Ser. No. 16/107,943, filed on Aug. 21, 2018, (now U.S. Pat. No. 10,052,595 on Oct. 20, 2020), which is a continuation of U.S. patent application Ser. No. 15/384,860, filed on Dec. 20, 2016, (now U.S. Pat. No. 10,052,595 on Aug. 21, 2018), which is a continuation of U.S. patent application Ser. No. 13/751,256, filed on Jan. 28, 2013, (now U.S. Pat. No. 9,522,367 on Dec. 20, 2016), which is a continuation in part of application Ser. No. 13/458,526, filed on Apr. 27, 2012, (now as U.S. Pat. No. 8,834,016), which is a non-provisional of U.S. provisional patent application Ser. No. 61/479,641, filed on Apr. 27, 2011, each of which applications/patents are incorporated herein by reference

BACKGROUND OF THE INVENTION

The need for a blending manifold has been made more evident by the use of multiple water sources and flowback use. With the continued discovery of shale plays throughout the world and the immense amounts of water needed to fracture these formations. Horizontal wells are becoming more prevalent with the use of sometimes more than 500, 000 gallons of water per stage in as many as 15 stage wells. The addition of chemicals to this collective mixture illustrates the need for uniformity throughout the water for optimum capability.

One embodiment relates generally to systems and methods for optimal mixing and distribution of two or more fluids, and more particularly, to systems and methods for optimal mixing and distribution of two or more fluids, including fracturing (frac) fluids and completion fluids, used in oil and gas operations.

In a variety of applications, the proper mixing and distribution of two or more fluids is a critical performance-affecting factor.

Many conventional manifold designs provide insufficient mixing and/or distribution of the subject fluids. For example, one conventional manifold design comprises a first pipe having inlets disposed thereon arranged in a first linear array pattern. The first pipe is connected via one or more conduits to a second pipe disposed substantially parallel to the first pipe, the second pipe having outlets disposed thereon arranged in a second linear array pattern. Fluids injected through the inlets travel through the first pipe to the connecting conduits and then into the second pipe where the fluid can then exit through the outlets. This flow path would ideally provide the means by which the injected fluids can thoroughly mix before exiting the manifold.

However, a typical scenario results in the fluid(s) injected through the outermost inlets of the first linear array pattern (i.e., the inlets disposed closest to the ends of the first pipe) being substantially absent from the outermost outlets of the second linear array pattern (i.e., the outlets disposed closest to the ends of the second pipe) positioned on the opposite side. A fluid injected through an inlet at one end of the first pipe is unlikely to travel in a flow path in which it will make it to an outlet at the opposite end of the second pipe.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being “critical” or “essential.”

Due to the fickle nature of some of the formations, it is imperative that pH changes are not sudden or drastic in nature. On numerous occasions stimulation services have been compromised due to a change in the composition of fluid. Recent studies show that only minimal formation permeability damage is induced by fracturing fluids permeability damage is induced by fracturing fluids with pH ranging from 4.7 to 11.5. The studies also indicate that optimum fluid pH range is seven to nine, where no appreciable damage occurs. It was felt these studies were merited because of the opposing views of the effect of treating fluid pH on the permeability of clay-bearing formations. Fluid pH is important in fracturing operations where it may vary from 4 to 10, depending on the system used. With crosslinked systems in particular, the pH greatly influences the stability of the fluid.

SUMMARY OF THE INVENTION

The apparatus of the present invention solves the problems confronted in the art in a simple and straightforward manner. What is provided is a multi chamber mixing chamber method and apparatus.

One or more embodiments of the invention provide systems and methods for optimal mixing and distribution of two or more fluids.

The drawings constitute a part of this specification and include exemplary embodiments to the invention, which may be embodied in various forms.

The present invention provides a mixing chamber having a body with an exterior wall surrounding an interior having first and second chambers. The chamber has a plurality of inputs and at least one output;

A first chamber and second chamber are fluidly connected to each other.

The plurality of inputs enter the first chamber and the plurality of outputs exit from the second chamber.

In one embodiment, the plurality of inputs being directed toward each other.

In one embodiment, the inputs are angled towards each other. In one embodiment, the angle is selected from the group consisting of 1, 2, 3, 4, 5, 6, 7, 8, 9, 10, 12, 14, 15, 16, 18, 20, 22, 24, 25, 26, 28, 30, 32, 35, 40, 45, 50, 55,60, 65, 70, 75, 80, 85, 86, 87, 88, 89, and 90 degrees relative to a perpendicular from the exterior wall of the chamber. In one embodiment, the angle is between a range of any two of the specified angles.

The present invention provides a method of mixing a plurality of fluid streams. The method provides a mixing chamber, the mixing chamber having a body, the body having an exterior wall with an interior having first and second chambers, and a plurality of inputs and at least one output.

The first chamber and second chamber are connected to each other, the plurality of inputs entering the first chamber and the plurality of outputs exiting from the second chamber; and the plurality of inputs being directed toward each other.

The method includes sending first and second fluid streams to the plurality of inputs, and the fluid streams being mixed in the interior of the chamber, and exiting a plurality of the outputs.

The present invention provides in another embodiment, mixing chamber having an elongated body with a first upstream end portion and a second downstream end portion and a wall surrounding an interior.

The interior has a dividing structure that divides the interior into primary and secondary chambers. The dividing structure includes a transverse plate that connects to the body wall at a position in between the body end portions, the plate extending over only a part of the cross section of the housing.

The dividing structure includes a longitudinal plate that extends longitudinally from one end portion of the housing a partial distance of the housing length connecting with the transverse plate.

A first mixing chamber is formed by the transverse plate, the longitudinal plate, and a portion of the body wall, the first mixing chamber extending only a partial distance along the length of the body.

A second mixing chamber is longer than the first mixing chamber, the second mixing chamber having a portion that contacts the longitudinal plate.

Multiple inlets are provided through the body wall that enable fluid to be added to the first mixing chamber.

Outlets in the body wall enable fluid discharge from the second chamber.

The longitudinal plate has a gate that enables fluid flow from the first chamber to the second chamber.

In one embodiment, some of the inlets are on opposing sides f the gate.

In one embodiment, the gate is in between two of said inlets.

In one embodiment, the transverse plate is positioned in the middle one-third of the body.

In one embodiment, there are outlets on the upstream side of the transverse plate.

In one embodiment, some of the outlets are in between the transverse plate and one of the inlets.

In one embodiment, one or more of the outlets are in between the transverse plate and the gate.

In one embodiment, there are one or more baffles next to the gate.

In one embodiment, all of the inlets are between the transverse plate and the first end portion of the body.

In one embodiment, some of the inlets include an elbow shaped fitting.

In one embodiment, some of the inlets include an elbow shaped fitting.

In one embodiment, all of the inlets include an elbow shaped fitting.

In one embodiment, all of the inlets include an elbow shaped fitting.

In one embodiment, a majority of the inlets are in between the transverse plate and the second end portion of the body.

In one embodiment, each inlet includes an annular flange.

In one embodiment, one or more baffles extend above the gate and one or more baffles extend below the plate.

In one embodiment, at least one of the elbow shaped fittings discharges flow toward the gate.

In one embodiment, multiple of the elbow shaped fittings discharge flow toward the gate.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Detailed descriptions of one or more preferred embodiments are provided herein. It is to be understood, however, that the present invention may be embodied in various forms.

Therefore, specific details disclosed herein are not to be interpreted as limiting, but rather as a basis for the claims and as a representative basis for teaching one skilled in the art to employ the present invention in any appropriate system, structure or manner.

Figure 1:
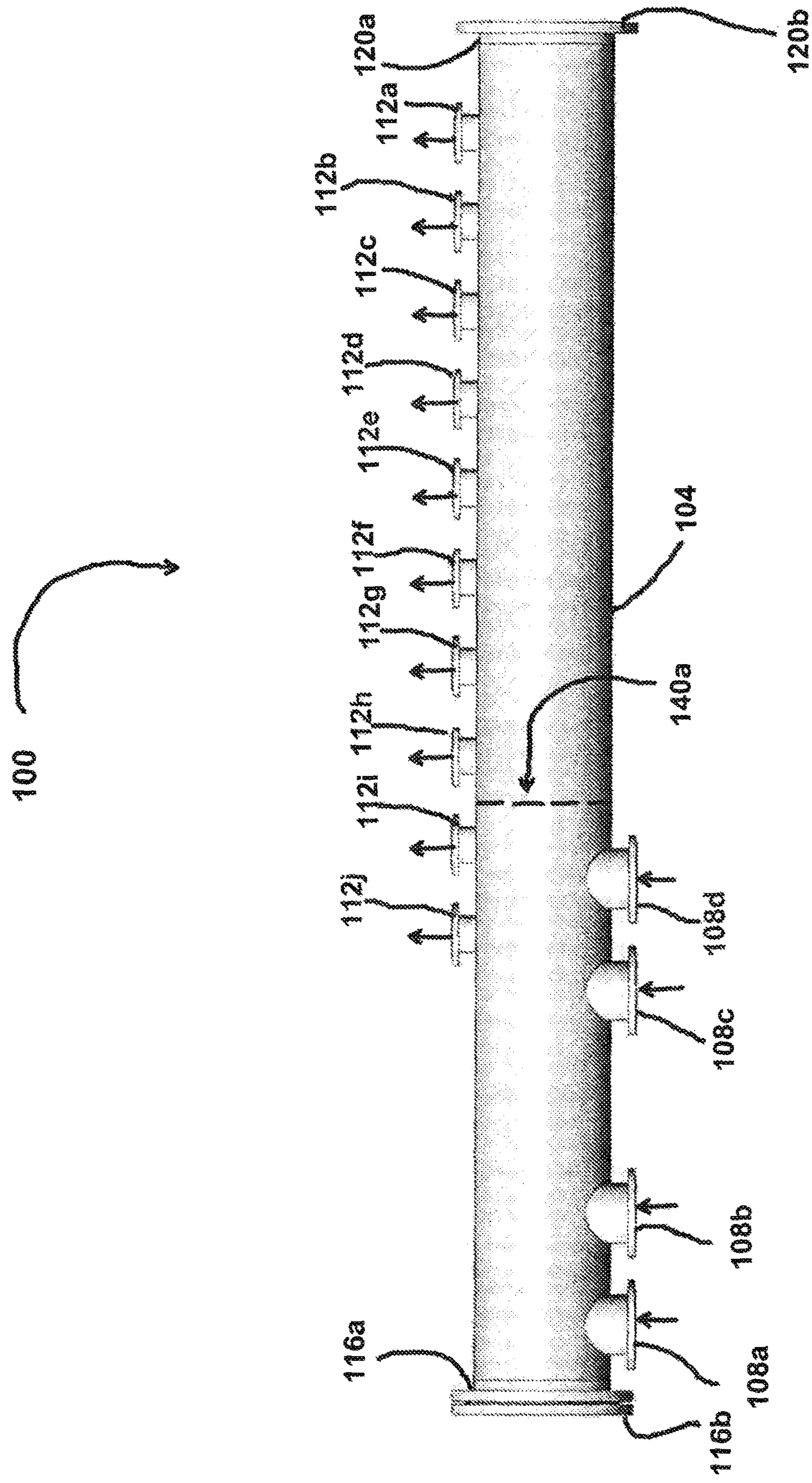
FIG. 1 shows a top view of the exterior of a multi-chamber manifold in accordance with one or more embodiments of the invention.
Figure 2:
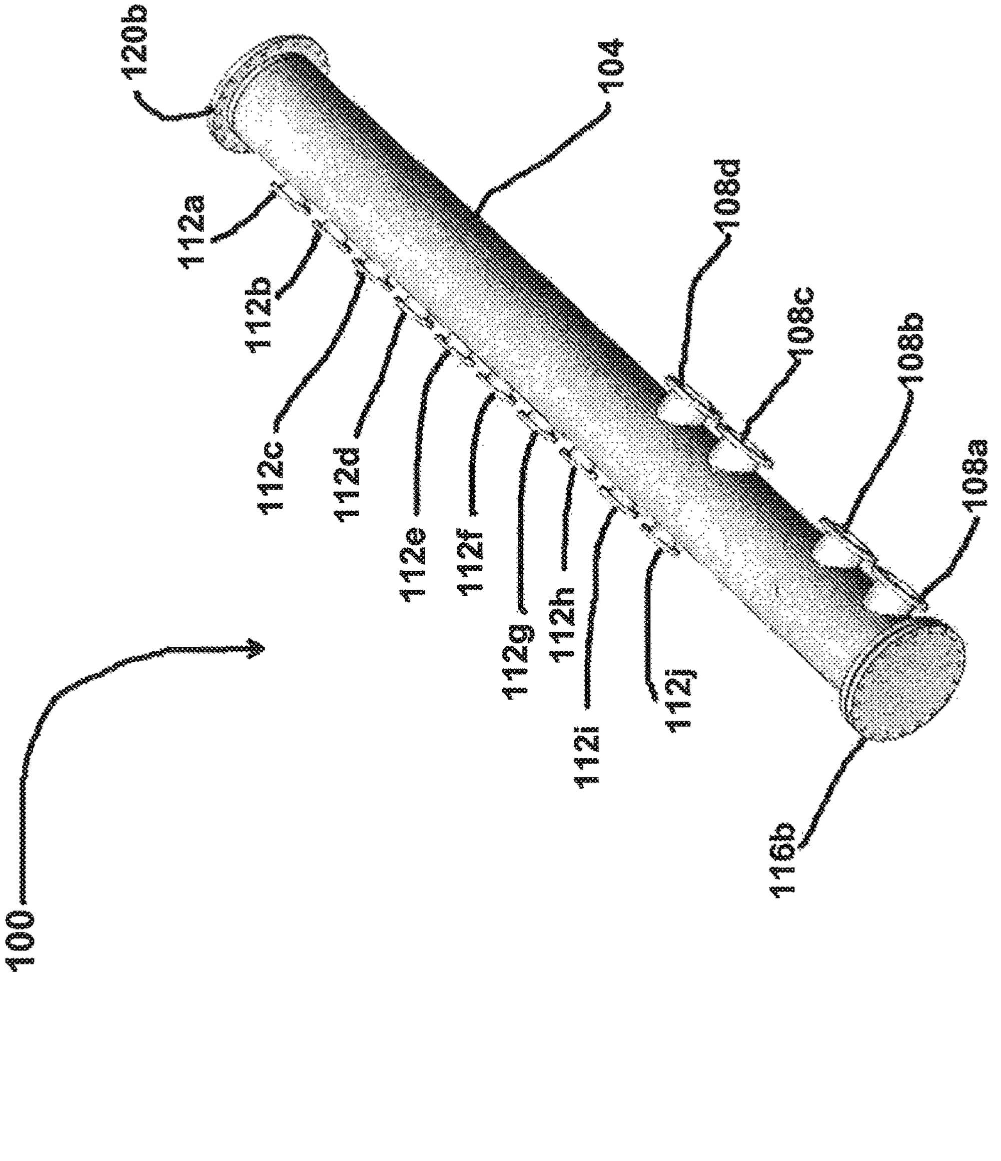
FIG. 2 shows a rear perspective view of the exterior of a multi-chamber manifold in accordance with one or more embodiments of the invention.

FIGS. 1-2 illustrate a top view and a perspective view, respectively, of the exterior of a multi-chamber manifold 100 in accordance with one or more embodiments of the invention.

The multi-chamber manifold 100 comprises an elongate housing 104 having a wall 105, (e.g., cylindrically shaped) first end 116*a* and a second end 120*a*. The ends 116*a*, 120*a* may be sealably capped provided with annular flanges 116C, 120C that can be closed or opened using flat or blocking end flanges 116*b*, 120*b* to prevent fluid from escaping therethrough. Flanges 116C, 120C can be removed so that housing 104 can be accessed for repair or cleaning of its interior. A plurality of fluid inlets 108*a*-108*d* may be disposed along housing 104 in a first linear array pattern. Outermost fluid inlet 108*a* may be disposed proximate the first end 116*a* and the first linear array pattern may extend towards the second end 120*a*. A plurality of fluid outlets 112*a*-112*j* may also be disposed along housing 104 in a second linear array pattern. Outermost fluid outlet 112*a* may be disposed proximate the second end 120*a* and the second linear array pattern may extend towards the first end 116*a*. Flow control valves (not shown) may be used to regulate fluid flow through the fluid inlets 108*a*-108*d* and the fluid outlets 112*a*-112*j*. In one embodiment, carbon steel may be used to construct the multi-chamber manifold 100. However, any material suitable for constructing a manifold for optimal mixing and distribution of two or more fluids may be used. While housing 104 is shown as being cylindrically shaped or having an annular cross-section, other configurations could be used in other embodiments.

Inlets 108*a*-108*d* may each be connected to one or more sources of fluid so that at least two different types of fluid may be fed or supplied to the multi-chamber manifold 100 for mixing and distribution. The fluids may include liquids and gases. In one embodiment, the fluids may comprise frac water blends obtained from a plurality of sources, or mixtures of frac fluids, chemical additives, and brines. Methods for facilitating the delivery of optimal volumes of a fracturing or "frac" fluid containing optimal concentrations of one or more additives to a well bore are disclosed in United States Patent Publication No. 2010/0059226 A1, which is incorporated herein by reference in its entirety. Where a definition or use of a term in the incorporated reference is inconsistent or contrary to the definition of that term provided herein, the definition of that term provided herein applies and the definition of that term in the reference does not apply. The systems and methods of the present invention may be used to provide a homogeneous fluid blend for use in conjunction with the incorporated reference.

Figure 3:
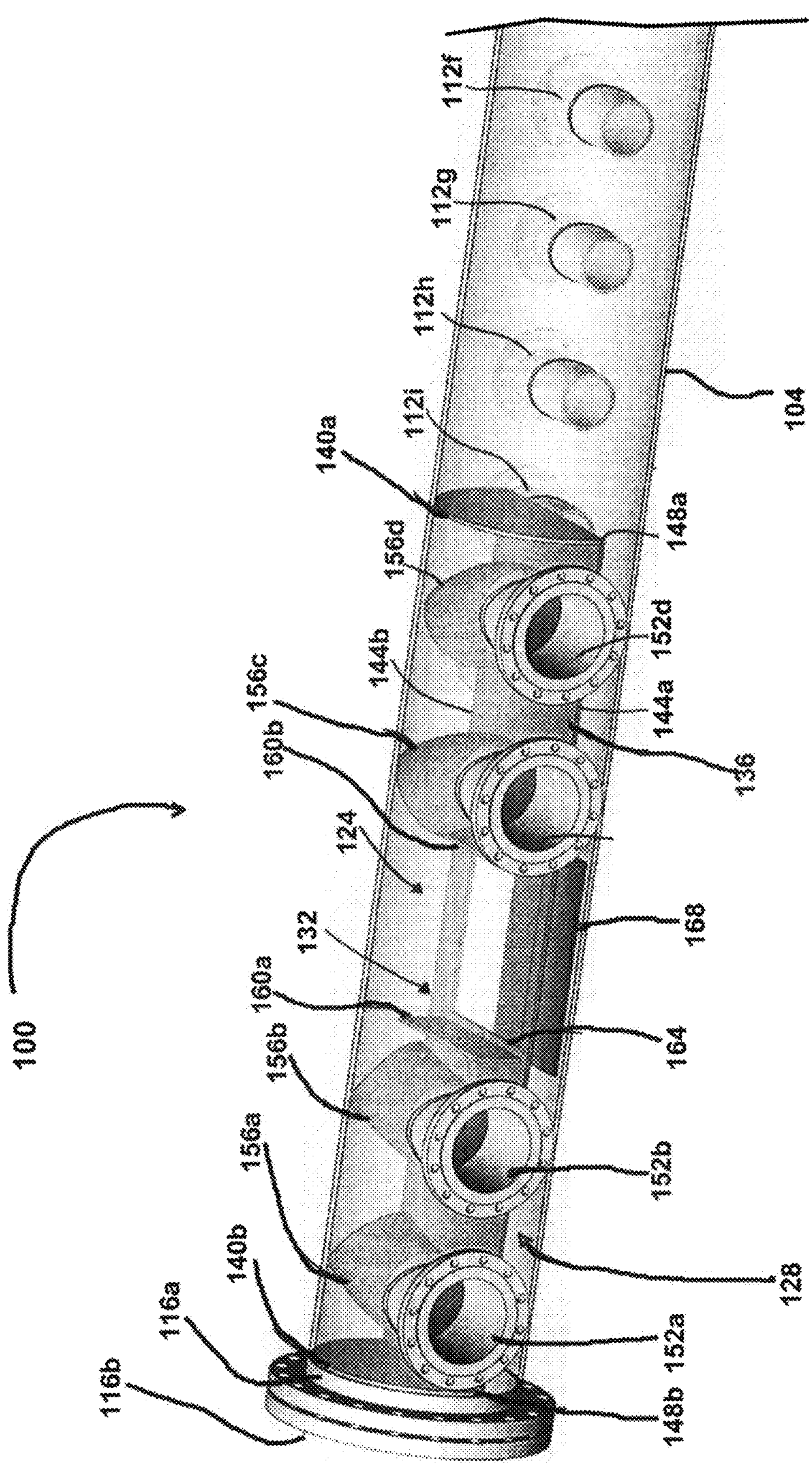
FIG. 3 shows a perspective view taken from the right side of the rear interior portion of a multi-chamber manifold in accordance with one or more embodiments of the invention.

Referring now to FIG. 3, an inside view of housing 104 according to one or more embodiments of the present invention is shown. Housing 104 of multi-chamber manifold 100, there may be provided a plurality of mixing chambers. In one embodiment, the multichamber manifold 100 comprises two chambers: a primary mixing chamber 124 (sometimes referred to hereinafter as "vortex chamber 124") and a secondary mixing chamber 128.

Figure 4:
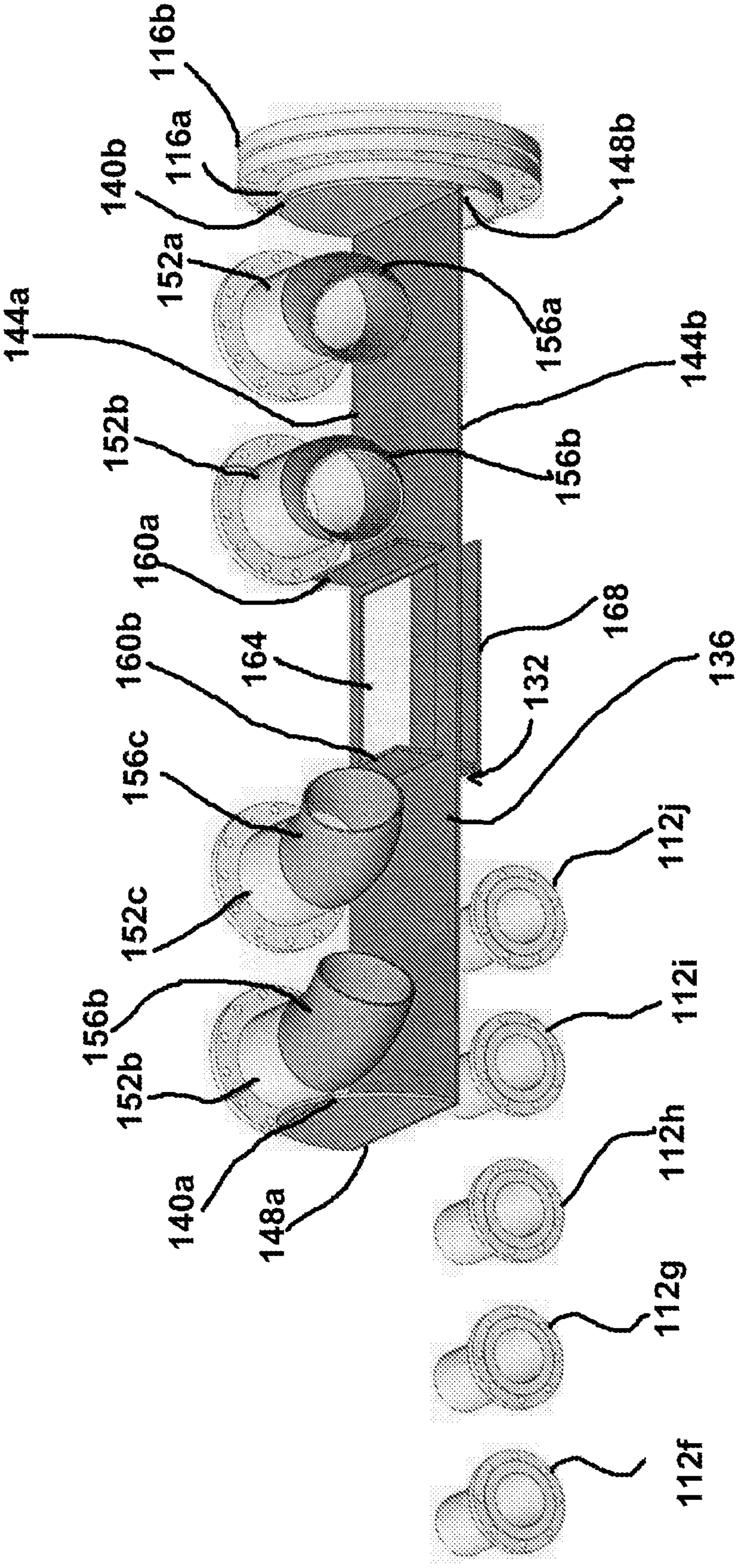
FIG. 4 shows a perspective view taken from the left side of the rear interior of a multi-chamber manifold in accordance with one or more embodiments of the invention.
Figure 6:
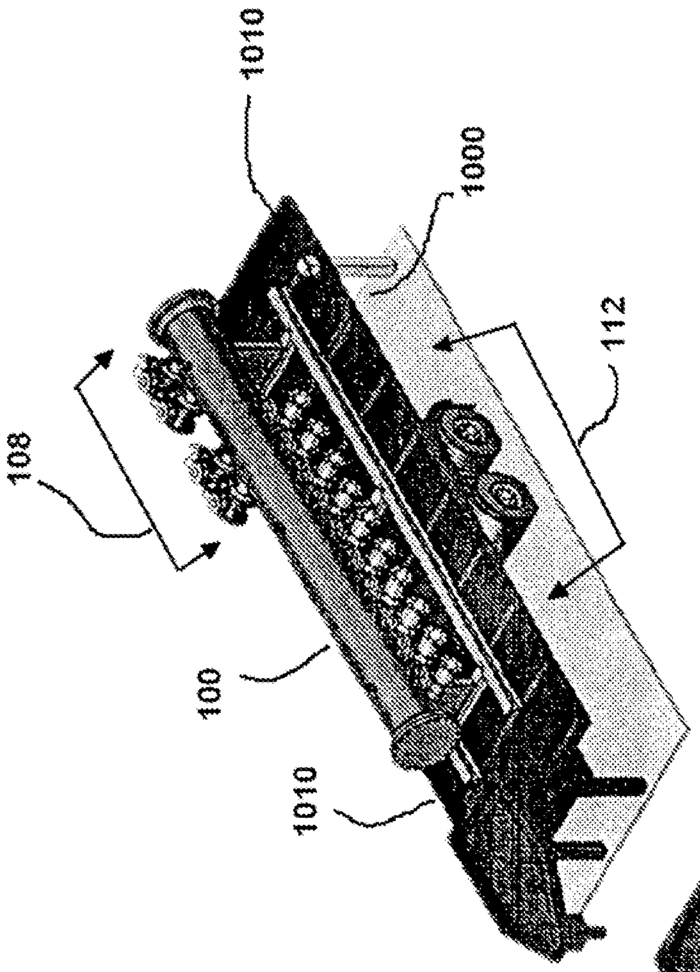
FIG. 6 is a front perspective view (taken from the left side) showing the multi-chamber manifold of FIGS. 1-4 mounted on a skid which in turn is mounted on a trailer.
Figure 5:
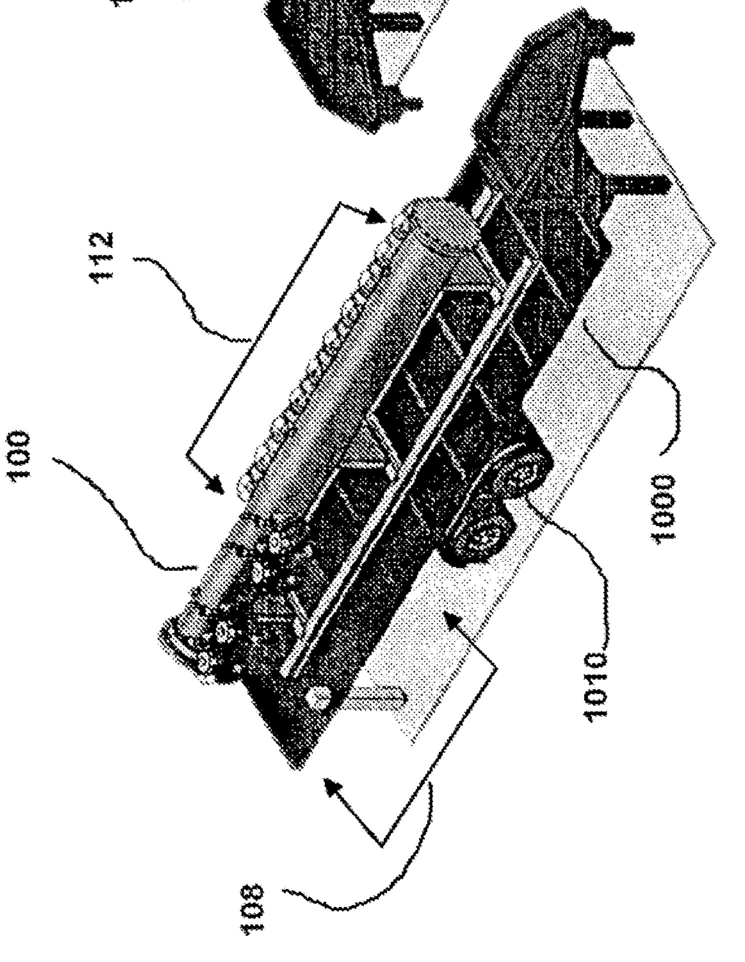
FIG. 5 is a front perspective view (taken from the right side) showing the multi-chamber manifold of FIGS. 1-4 mounted on a skid which in turn is mounted on a trailer.

As shown in FIGS. 3-4, the vortex chamber 124 may comprise a chamber separation structure 132 separating the vortex chamber 124 from the secondary mixing chamber 128. An upper portion of the inner wall of housing 104 may define upper and lateral boundaries of the vortex chamber 124. The vortex chamber 124 may be disposed proximate the first end 116*a* of housing 104 such that the vortex chamber 124 may receive fluid entering the multi-chamber manifold 100 through the inlets 108*a*-108*d*.

The chamber separation structure 132 may comprise a horizontal chamber separation plate 136 defining a lower boundary of the vortex chamber 124 and one or more vertical chamber separation plates 140*a*, 140*b* defining lateral boundaries of the vortex chamber 124. The horizontal chamber separation plate 136 comprises side walls 144*a*, 144*b* that may be sealably coupled to the inner wall of housing 104. The one or more vertical chamber separation plates 140*a*, 140*b* may be oriented substantially perpendicular to the horizontal chamber separation plate 136. The one or more vertical chamber separation plates 140*a*, 140*b* may be disposed at and sealably coupled to the ends 148*a*, 148*b* of the horizontal chamber separation plate 136. In one embodiment, a portion of vertical chamber separation plate 140*a* may be shaped to conform to the geometry of the inner wall of housing 104 and welded thereto so as to create a sealed barrier, preventing the fluid mixture inside the vortex chamber 124 from flowing laterally in a direction towards the second end of housing 120*a*.

Inlets 108*a*-108*d* may be in the form of spool pieces that protrude both outwardly and inwardly with respect to housing wall 105, each outward-inward protrusion combination forming an inlet nozzle defining a passage through which a fluid may be injected to the vortex chamber 124. The outwardly protruding portions 152*a*-152*d* of the inlet nozzles allow for fluids to commence its flow path into the multichamber manifold 100 such that the fluids flow substantially radial to housing 104. The outwardly protruding portions 152*a*-152*d* of the inlet nozzles can be cylindrical sections of pipe fitted (e.g. welded) with annular flanges. The inwardly protruding portions 156*a*-156*d* of the inlet nozzles are angled to affect an angular velocity on the fluids, projecting the fluids into the vortex chamber 124 in a manner causing the fluids to swirl rapidly about a center. The inwardly protruding portions 156*a*-156*d* of the inlet nozzles can be elbow fittings such as weld elbows which are commercially available. This induced swirl, or vortex, provides turbulent flow that facilitates thorough mixing of the injected fluids, producing a substantially homogeneous blend. The specific angle of each inlet nozzle is determined based on the particular application. For most manifolds you have a given number of inlets 108*a*-108*d* for a given number of outlets 112*a*-112*j* with the hope of creating enough turbulent flow for a homogenous mixture. To enhance this process, the inlets are angled at the elbows or inwardly protruding portions 156*a*-156*d* to maximize the vortices to create a greater turbulent flow allowing for maximum, complete mixing.

The chamber separation structure 132 may further comprise a plurality of baffle plates 160*a*, 160*b* that extend upwardly from and substantially perpendicular to the horizontal chamber separation plate 136. As previously described, the inlet nozzles are angled to induce a vortex that facilitates the mixing of the injected fluids. The upwardly extending baffle plates 160*a*, 160*b* serve to guide the mixture of fluids through a gate 164 disposed between the upwardly extending baffle plates 160*a*, 160*b*, the gate 164 defining an opening in the horizontal chamber separation plate 136. The gate 164 directs enables mixture of fluids to flow from the first chamber 124 to the secondary mixing chamber 128.

One or more inlet nozzles may be disposed at either side of the upwardly extending baffle plates 160*a*, 160*b*. For example, in one embodiment, a first set of two inlet nozzles may be disposed at a lateral distance from upwardly extending baffle plate 160*a*, proximal to the first end 116*a* of housing 104. In this configuration, a second set of two inlet nozzles may also be disposed at a lateral distance from upwardly extending baffle plate 160*b*, distal to the first end 116*a* of housing 104 relative to first set of inlet nozzles. The inwardly protruding portions 156*a*-156*d* of the inlet nozzles may be angled upward relative to the horizontal chamber separation plate 136 and inward relative to the one or more vertical chamber separation plates 140*a*, 140*b*. Thus, the two sets of inlet nozzles may provide a mirror image trajectory of vectored fluid flow allowing the fluids to coincide and induce the vortex above the gate 164. Gravity causes substantially all of the fluid mixture to flow downwardly through gate 164, guided, in part, by upwardly extending baffles 160*a*, 160*b*.

The chamber separation structure 132 may further comprise an L-shaped baffle plate 168 connected to the bottom surface of the horizontal chamber separation plate 136 and disposed below the gate 164. Upon passing through gate 164, the fluid mixture encounters the L-shaped baffle plate 168, which guides the fluid mixture flow in a first direction towards the first end 116*a* of housing 104. The change in flow direction of the fluid mixture caused by the L-shaped baffle plate 168 may further enhance the mixture quality.

Another change in flow direction is caused by the fluid mixture encountering the first end 116*a* of housing 104, which forces the fluid mixture to flow in a second direction opposite the first direction. This change in flow direction further enhances the mixture quality. Moreover, as the fluid mixture flows in the second direction, it flows past the L-shaped baffle plate 168 towards the second end 120*a* of housing 104 where the fluid mixture can then be evenly distributed among fluid outlets 112*a*-112*j*.

Although FIGS. 3-4 show multi-chamber manifold 100 having two chambers (vortex chamber 124 and secondary mixing chamber 128), it is envisioned that other embodiments may have additional chambers for further mixing. A secondary spill over plate (not shown) may be incorporated in the secondary mixing chamber 128 in order to capture solids or perform a two-stage fluid separation prior to the fluid mixture exiting through outlets 112*a*-112*j*. For example, in one or more embodiments, a two-stage fluid separation may involve the separation of oil and water.

The multi-chamber manifold 100 illustrated in FIGS. 1-4 may be designed and constructed to be lightweight, compact, and portable. In one or more embodiments of the invention, the multi-chamber manifold 100 may be mounted on a trailer, truck, or any other suitable vehicle for transporting the manifold 100 to various work sites. However, in other embodiments of the invention, the manifold 100 may be fixed to a particular location.

Figure 7:
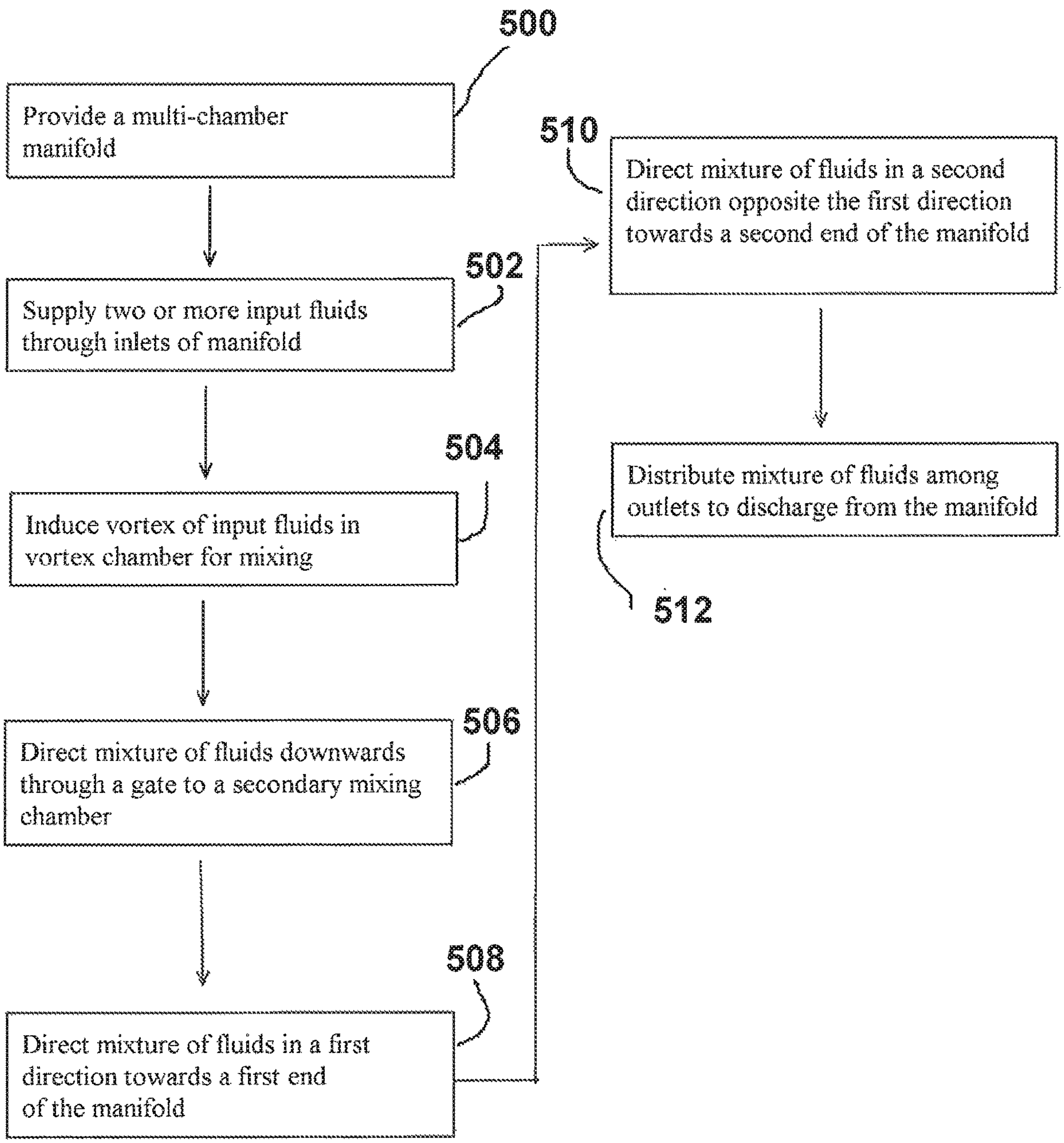
FIG. 7 shows a flowchart illustrating a method in accordance with one or more embodiments of the invention.

One or more embodiments of the present invention relate to methods for enhanced mixing of fluids, as shown by the flow chart in FIG. 7. The methods involve providing a multichamber manifold 500, the manifold comprising a housing, a plurality of fluid inlets, a plurality of fluid outlets, a vortex chamber, and a secondary mixing chamber.

The methods further involve supplying two or more input fluids to the manifold through the fluid inlets of the manifold 502. The fluids may flow through inlet nozzles and into the vortex chamber. The fluid nozzles may be angled to induce a vortex in the vortex chamber 504. The vortex serves the purpose of stirring the input fluids for thorough mixing, producing a fluid mixture.

The fluid mixture may be directed downwards from the vortex chamber through a gate to a secondary mixing chamber 506 for further mixing. Baffles may be used to guide the flow path of the fluid mixture in various directions. The fluid mixture may be directed in a first direction towards a first end of the manifold 508. The fluid mixture may also be directed in a second direction opposite the first direction towards a second end of the manifold 510. Changing the direction of the fluid mixture flow path facilitates further mixing of the fluids.

The resulting homogeneous fluid blend may be distributed among the plurality of fluid outlets to discharge from the manifold 512. The destination of the fluid mixture after discharging from the manifold depends on the particular application. Fluid flow can be directed in its entirety to one destination or distributed either evenly or proportionally to multiple destinations.

It is to be understood that the invention is not to be limited or restricted to the specific examples or embodiments described herein, which are intended to assist a person skilled in the art in practicing the invention. For example, the number of fluids to be mixed, the number of inlets, the number of outlets, the number of spill over plates, and the number of chambers may vary according to the desired results of a particular application. Also, the dimensions of the various components of the multi-chamber manifold may be scaled to achieve the desired results of a particular application. Accordingly, numerous changes may be made to the details of procedures for accomplishing the desired results. These and other similar modifications will readily suggest themselves to those skilled in the art, and are intended to be encompassed within the spirit of the present invention disclosed herein and the scope of the appended claims.

The following testing procedure can be used to test the effectiveness of mixing:

1. Add dye to one of two frac tanks as a control;
2. Collect a 500-mL sample from the dyed tank and another sample from the undyed tank;
3. Open both tanks and allow them to flow to the blending manifold 100;
4. After allowing flow through the blending manifold for 30 seconds, collect 250-mL samples from each outlet;
5. In the lab, construct a 50/50 sample of the two tank samples and that will be your control to compare the outlet samples.

In the table below, there is a comparison of the results from the blending manifold and a lab 50:50 blend:

TABLE 1

| COLOR TESTING | | |
|---|---|---|
| | Test #1 PCU-Platinum Cobalt Units | Test #2 PCU-Platinum Cobalt Units |
| Lab Generated 50:50 Blend | 12 | 12 |
| Outlet #1 | 13 | 10 |
| Outlet #3 | 13 | 11 |
| Outlet #5 | 11 | 10 |
| Outlet #7 | 14 | 13 |
| Outlet #9 | 12 | 14 |
| Mean** | 12.6 | 11.6 |
| Standard Deviation* | 1.1402 | 1.8166 |

Total Dissolved Solids (TDS) is a measure of the combined content of all inorganic and organic substances contained in a liquid. Increased levels of TDS in water indicated what is known as hard water. Hard water can cause scale build up in pipes, valves and filters. This build up can restrict flow to almost non-existent, which lead to increased operational costs.

TDS have an adverse effect on hydraulic fracturing fluids and the chemicals added to them:

Calcium/Magnesium—water with high hardness can prevent proper gelling, crosslinking, temperature maintenance, and shear stability. Adversely affects FR performance when run with FDP-S798.

Reducing Agents—can prevent proper gel hydration, crosslinking, and will neutralize oxidizing breakers. Addition of oxidizer (SP, AP) may prevent these problems.

Sulfates—may cause precipitation of crosslinkers-increasing crosslinker concentration may prevent this problem.

Phosphates—At sufficient concentrations, phosphates can completely prevent crosslinking. When phosphates are present in mix water, crosslinker concentration may need to be increased.

As the lab results of the Table 1 show, the blending manifold gives an almost 50:50 blend of the incoming fluid. With this homogenous blend it will enable the adequate amount of chemicals to be added without a composition change of the fluid. This also allows for less risk of sudden pressure changes that could result due to an unstable pH of the fluid. This manifold will allow for flowback to be used in a more predictable fashion.

Proper detection of the levels of total dissolved solids within a given water source will maintain the integrity of the fracturing fluid. Problems that could arise are when there is a change in flowrates from the given sources. This in turn will lead to over/under compensation as far as chemical treatment which can damage formations.

The following is a list of reference numerals and corresponding part descriptions:

LIST FOR REFERENCE NUMERALS (Part No.) (Description)

100 multi-chamber manifold
101 interior
104 elongate housing
105 housing wall/cylindrical wall
116*a* first end 116*a*
120*a* second end
116*b* blocking end flange
120*b* blocking end flange
108 fluid inlets (108*a*-108*d*)
112 plurality of fluid (outlets 112*a*-112*j*)
124 a primary mixing chamber (vortex chamber)
128 secondary mixing chamber
132 chamber separation structure
136 horizontal chamber separation plate
140*a* vertical chamber separation plate
140*b* vertical chamber separation plate
144*a* side wall
144*b* side wall
152 outwardly protruding portions (152*a*-152*d*) of the inlet nozzles
156 inwardly protruding portions (156*a*-156*d*) of the inlet nozzles are angled to affect an angular velocity on the fluids
160*a* baffle plate
160*b* baffle plate
164 gate
168 L-shaped baffle plate
500 step of providing a multichamber manifold
502 step of supplying two or more input fluids to the manifold
504 step of inducing a vortex in the vortex chamber 504
506 step of directing fluids from the vortex chamber to a secondary mixing chamber
508 step of directing the mixture of fluids in a first direction towards a first end of the manifold
510 step of directing mixture of fluids in a second direction, which second direction is substantially the opposite direction as the first direction, and towards a second end of the manifold
512 step of distributing the mixture of fluids among outlets to discharge from the manifold All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A mixing chamber comprising:

(a) a body, the body having first and second body ends, an exterior wall with an interior having first and second chambers, and a plurality of inputs and at least one output;

(b) the first chamber and second chamber being fluidly connected to each other;

(c) a separator that separates the first and second chambers, the separator including a first plate having first and second first plate side edges that each connect to the exterior wall first and second first plate end portions, the first first plate end portion connecting to the first body end, a second plate connected to the exterior wall and to the second first plate end portion at a position spaced in between the first and second body ends;

(d) the plurality of inputs entering the first chamber and the at least one output exiting from the second chamber, and (e) at least two of the plurality of inputs being directed towards each other.

2. The mixing chamber of claim 1, wherein the inputs are angled towards each other.

3. The mixing chamber of claim 2, wherein angles formed by the inputs relative to the exterior wall of the chamber fall within a range of between 5 and 30 degrees relative to a perpendicular from the exterior wall of the chamber.

4. A mixing chamber comprising:

(a) an elongated body forming a housing with a cross section having an upstream end portion and a downstream end portion and a wall surrounding an interior;

(b) the interior having a separator that separates the interior into primary and secondary chambers;

(c) the separator including a first plate that connects to the wall at a position in between the upstream and downstream end portions, the first plate extending over only a part of the cross section of the housing;

(d) the separator including a second plate having second plate edges and second plate end portions, said edges connecting to the wall, one said end portion connecting to said upstream end portion, wherein said second plate extends from one end portion of the housing a partial distance of the housing length and connecting with the first plate at a said first plate end portion;

(e) a first mixing chamber formed by the first plate, the second plate, and a portion of the wall, the first mixing chamber extending only a partial distance along the length of the body;

(f) a second mixing chamber having a portion that contacts the first plate;

(g) multiple inlets through the wall that enable fluid to be added to the first mixing chamber;

(h) one or more outlets in the wall that enable fluid discharge from the second chamber; and (i) a flow path gate that extends through the separator, and that enables fluid flow from the first chamber to the second chamber.

5. The mixing chamber of claim 4, wherein some of the inlets are on opposing sides of the flow path gate.

6. The mixing chamber of claim 5, wherein the flow path gate is in between two of said inlets.

7. The mixing chamber of claim 4, wherein the second plate is positioned in the middle of the elongated body.

8. The mixing chamber of claim 4, wherein there are outlets on the upstream side of the second plate.

9. The mixing chamber of claim 5, wherein some of the outlets are in between the second plate and one of the inlets.

10. The mixing chamber of claim 1, wherein one or more of the outlets are in between the second plate and the flow path gate.

11. The mixing chamber of claim 1, wherein there are one or more baffles next to the flow path gate.

12. The mixing chamber of claim 4, wherein all of the inlets are between the second plate and the first end portion of the elongated body.

13. The mixing chamber of claim 4, wherein some of the inlets include an elbow shaped fitting.

14. The mixing chamber of claim 5, wherein some of the inlets include an elbow shaped fitting.

15. The mixing chamber of claim 4, wherein a majority of the inlets are in between the second plate and the second end portion of the elongated body.

16. The mixing chamber of claim 11, wherein a first set of one or more baffles extend above the flow path gate and a second set of one or more baffles extend below the second plate.

17. The mixing chamber of claim 4, wherein the multiple inlets include at least one elbow shaped fitting that discharges flow toward the flow path gate.

18. The mixing chamber of claim 17, wherein the multiple inlets include multiple elbow shaped fittings that discharge flow toward the flow path gate.

* * * * *